US 6,701,356 B1

(12) United States Patent
Condict et al.

(10) Patent No.: US 6,701,356 B1
(45) Date of Patent: Mar. 2, 2004

(54) METHOD AND APPARATUS FOR AUTOMATICALLY DOWNLOADING PROFILE AND IMAGE FILES FOR OPTICAL NETWORK ELEMENTS

(75) Inventors: Keith A. Condict, Gambrills, MD (US); James B. Wensink, Marietta, GA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/292,042

(22) Filed: Apr. 14, 1999

Related U.S. Application Data

(60) Provisional application No. 60/081,861, filed on Apr. 15, 1998.

(51) Int. Cl.⁷ .............................................. G06F 15/177
(52) U.S. Cl. ...................... 709/220; 709/223; 717/168
(58) Field of Search ................................ 709/220, 221, 709/222, 223, 224; 717/168, 170, 171, 172

(56) References Cited

U.S. PATENT DOCUMENTS

| | | | | |
|---|---|---|---|---|
| 5,838,981 A | * | 11/1998 | Gotoh | 717/168 |
| 5,999,740 A | * | 12/1999 | Rowley | 709/221 |
| 6,006,034 A | * | 12/1999 | Heath et al. | 717/170 |
| 6,151,643 A | * | 11/2000 | Cheng et al. | 709/220 |
| 6,282,709 B1 | * | 8/2001 | Reha et al. | 717/175 |

FOREIGN PATENT DOCUMENTS

| | | |
|---|---|---|
| EP | 0632629 | 1/1995 |
| EP | 0797159 | 9/1997 |
| WO | 9731504 | 8/1997 |

OTHER PUBLICATIONS

Johansson, S., "Transport Network Involving a Reconfigurable WDM Network Layer—A European Demonstration", Journal of Lightwave Technology, vol. 14, No. 6, 1996.

* cited by examiner

*Primary Examiner*—Zarni Maung
(74) *Attorney, Agent, or Firm*—Michael Cammarata; Daniel Daisak; Donald Perreault

(57) ABSTRACT

A method and apparatus for automatic downloading and updating of network element software profile files (SPF's) and network element module software images. Embodiments of the invention provide a software routine and system which is executable through the network management system. The utilization of the software routine allows for updating SPF's and software images in the NCP and other modules within the network, while minimizing the interruptions in the data flow. This is accomplished by utilizing a primary and secondary SPF. The updated profile is downloaded as the secondary SPF and secondary images are reconciled with the new secondary SPF. This same operation is then performed with other modules in the network. Upon reconciliation of SPF and software images, the secondary SPF and software images are switched with the primary SPF and software images within the NCP and modules, thereby updating the entire system.

29 Claims, 7 Drawing Sheets

METHOD AND APPARATUS FOR AUTOMATICALLY DOWNLOADING PROFILE AND IMAGE FILES FOR OPTICAL NETWORK ELEMENTS

CROSS REFERENCE TO RELATED APPLICATIONS

The present application claims the benefit of the filing date of U.S. Provisional Application No. 60/081,861, filed Apr. 15, 1998, the teachings of which are incorporated herein by reference.

FIELD OF THE INVENTION

The present invention is directed to an aspect of an optical network management system and, in particular, to a method and apparatus for automatically downloading image files related to particular network element modules to ensure proper communication between the network elements and the network management system.

BACKGROUND OF THE INVENTION

Optical communication systems have traditionally been used for long-haul point-to-point transmissions carrying high volume traffic. An approach to increasing the transmission capacity of these systems is to employ wavelength division multiplexing (WDM), wherein a plurality of optical channels, each at a respective wavelength, are multiplexed and transmitted over a waveguide medium to a plurality of receivers. Typically, the selected bandwidth of the optical channels corresponds to the low loss window of the waveguide medium, for example, silica-based fibers.

Early WDM systems transmitted up to four distinct channels over a single fiber. Recent technological advances are, however, allowing ever-increasing numbers of channels to be transmitted over a single fiber. Generally, systems that transmit in excess of four channels are referred to as Dense Wavelength Division Multiplexed (DWDM) systems in recognition of the closer spacing between the respective channels.

A typical point-to-point or long-haul optical communications network employing WDM or DWDM technology may include at least two end terminal nodes for transmitting and receiving each of the optical channels. The terminal nodes usually provide interfaces to other fiber optic transmission systems. A plurality of amplifiers, spaced along the path between the terminal nodes, are used to amplify the signals transmitted therebetween. The number of amplifiers corresponds to the transmission distance between the terminal nodes. Each terminal and amplifier node typically includes a plurality of optical and/or electrical components to process and/or transmit the information carried by the optical signals.

With the increasing demands on communication systems, as well as advances in optical component technology, optical networks have been employed for smaller communication systems such as local telephone or data networks, e.g., LANS, MANS, etc. In these smaller configurations, communications signals are transmitted over a limited geographic area to various nodes within a network. Similar to long-haul or point-to-point systems, nodes within the network typically include optical receivers for receiving the transmitted signals, photodetectors for generating electrical signals in response to the received signals, and optical transmitters for supplying information signals to additional network nodes. These smaller systems may or may not include amplifiers depending on the distance over which the transmission signals travel.

To insure proper operation of each component within both the long-haul and smaller network systems, as well as the network as a whole, network management systems, including management software and associated user interfaces, have become an integral part of communication systems. These network management systems provide information related to each component within the network. To ensure proper system functionality, components within these types of networks must be constantly monitored, and be able to report information regarding the component's operating status. In the event of failure, such as a fiber break, component malfunction, or network configuration change, the management system must be able to recognize and accommodate these conditions, e.g., by re-routing system traffic.

Because communications systems provide for an open architecture, where the network may be expanded to provide increased signal traffic, network management systems must be able to accommodate and process these expanding systems. Typical network management systems have the ability to communicate with high level support protocols such as SNMP (Simple Network Management Protocol). In addition, when updated components such as transmitters and receivers are added to a network element of an existing network, the management software must be able to recognize these new components. Furthermore, when a new version of the network management software is installed, each component within the system must be able to communicate with this new software.

Presently, when either of the above situations occur, intervention by network operators is required to manually update the software images associated with each network component so that the component can be recognized by, and communicate with, the network management software. This process is cumbersome, time-consuming, and inefficient. Accordingly, there is a need for a system and method for determining if a new software image is required in any network element and for automatically updating the software images related to network components without disrupting operation of any part of the communications system.

SUMMARY OF THE INVENTION

The present invention is organized about the concept of providing a method and apparatus for automatic downloading and updating of network element software profile files and network element module software images. Updating of network element software profile files and network element module software images may be achieved via a software routine which may be stored in the RAM of each node control processor for execution by the CPU of each node control processor. The software may also be stored on any computer readable medium, e.g., floppy disk, CD-ROM, hard drive, ZIP disk, etc., for installation on a network, e.g., by downloading to the network NCPs. The routine includes instructions which may be initiated through the network management system by an operator, thereby obviating the need for manually updating the module software images, as required in the prior art.

In one embodiment of the invention, when a network change is initiated which would disrupt communication on the network, e.g., prior to installation of a new network management software revision, installation of a new module, etc., a new software profile file is first downloaded into the flash memory of each network node control processor as the node control processor secondary software profile file. The secondary node control processor image is then reconciled with the entry in the new software profile file. If the secondary node control processor image does not match the entry in the new secondary software profile file, then the proper secondary node control processor image is automatically downloaded or copied from another location.

Once the secondary node control processor image has been reconciled, the secondary images of the optical data acquisition and control network element modules are reconciled with their corresponding entries in the new secondary software profile file. If the secondary images do not match the corresponding entries in the new software profile file, then the proper images are downloaded. The downloading process may be based on a search algorithm which locates, the most bandwidth efficient way, via service channel signal of system, to download the image to the network element module.

Once all secondary images are reconciled with the new software profile file in the node control processor, an operator action initiates the process of switching the primary and secondary software profile files and images, and resetting all modules to guarantee that the new primary images are also the running images. The new set of software images then may be tested prior to an operator action which initiates the copying of the primary software profile file and primary images to the secondary software profile file and secondary images. In this manner, new network management software revisions may be installed, new modules may be inserted into any network element, and new network elements may be added to network with the software profile file for each network element and the software images for each module within the network element being downloaded automatically to ensure consistent network management operation. In addition, according to the invention, the primary image is maintained as the running image at all times, and disruption of the primary image is limited through use of the secondary images and profiles.

To ensure proper operation of the node control processors and the associated modules, and to verify that the foregoing downloading and uploading procedures were performed correctly, according to another aspect of the invention, the primary and secondary images may be further reconciled each time the node control processors are reset. Again, this procedure is designed to limit the disruption of the primary image and to maintain the running image as the primary image at all times. Upon a reset, the node control processor primary image is first reconciled, after which all optical data acquisition and control module primary images are reconciled. The secondary images are then reconciled independently.

In addition, according to another aspect of the invention, the primary and secondary images may be further reconciled each time an optical data acquisition and control module is reset. The primary images are first reconciled, after which the secondary images are reconciled.

BRIEF DESCRIPTION OF THE DRAWING

For a better understanding of the present invention, together with other objects, features and advantages, reference should be made to the following detailed description which should be read in conjunction with the following figures wherein like numerals represent like parts.

DETAILED DESCRIPTION OF THE INVENTION

Figure 1:
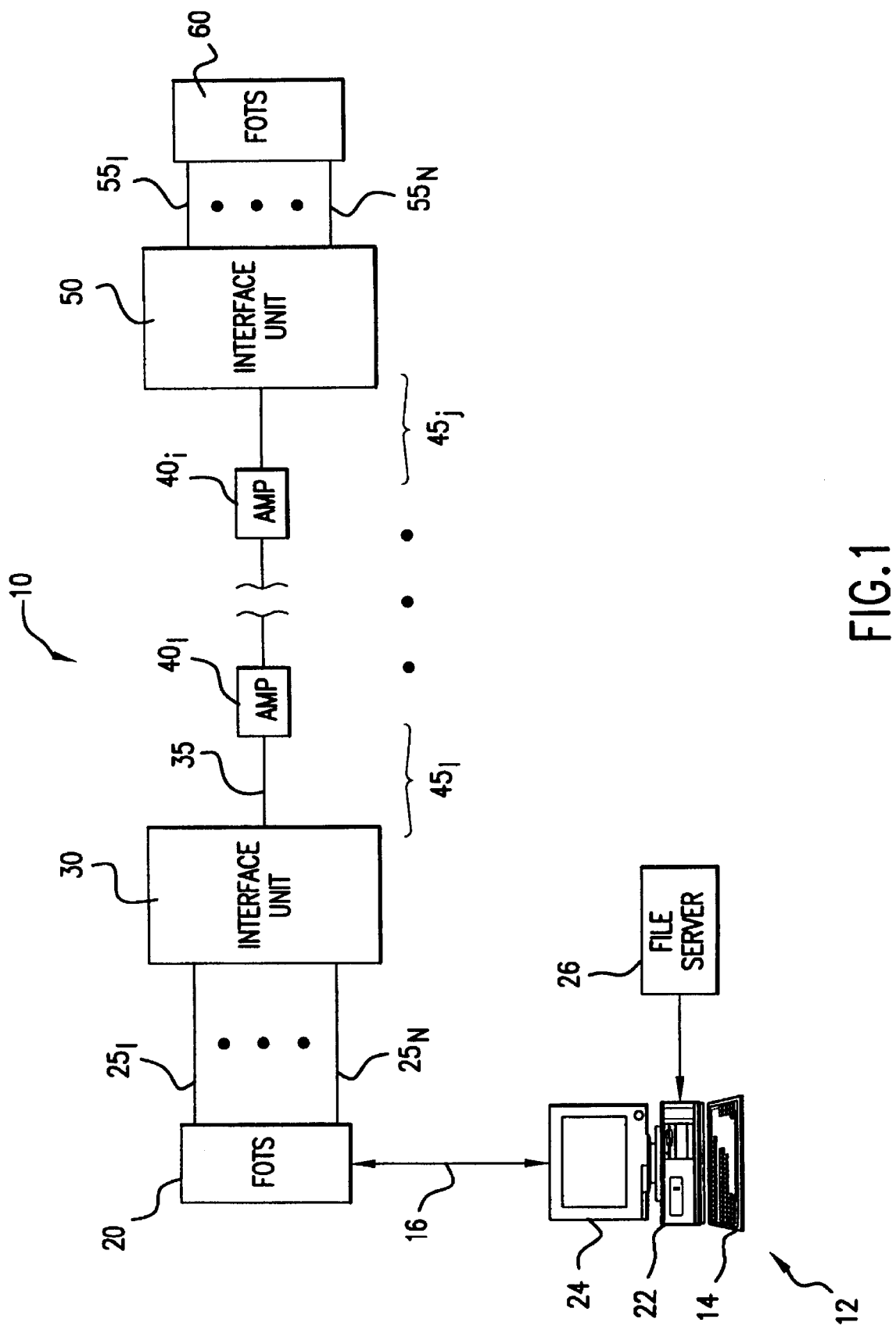
FIG. 1: is a schematic illustration of a portion of an exemplary optical communication system in accordance with the present invention.

FIG. 1 illustrates, in diagrammatic form, an exemplary optical communication system 10 in accordance with a feature of the present invention. Although system 10 is depicted as a point-to-point WDM system, the principles of the present invention may also be applied to other network configurations, including rings, and is not limited to WDM networks. In particular, the principles of the present invention may be applied to any communications network having a plurality of network elements configured to provided monitoring information for use with network management or monitoring software.

As illustrated in FIG. 1, a plurality of optical communication signals, e.g. SONET formatted signals, are supplied by fiber optic transmission system (FOTS) 20 to first interface unit 30. These signals carry data information and are supplied to interface unit 30 via lines $25_1 \ldots 25_N$, which assigns each SONET optical signal to a corresponding one of a plurality of wavelengths or channels. The wavelengths are combined using a multiplexer included within interface unit 30, as is commonly understood in the art, and supplied to fiber 35 for transmission to second interface unit 50 via amplifiers $40_1 \ldots 40_i$. The amplifiers $40_1 \ldots 40_i$, regenerate the WDM signal along fiber 35 according to predetermined transmission distances.

The communication signals are received by interface unit 50 which includes a demultiplexer for separating the individual optical channels. Once separated, the optical channels are supplied to respective receivers, which may be included in interface unit 50. The receivers, in turn, reconstruct the SONET optical signals, or signals having another protocol, for transmission to FOTS 60, or an interface unit (not shown) via lines $55_1 \ldots 55_N$.

The transmission between two terminals, either from an end node to an amplifier, or from amplifier to amplifier, is referred to as a "span." For example, span $45_1$ includes interface unit 30 and line amplifier $40_1$. Similarly, span $45_j$, runs from amplifier $40_i$ to interface unit 50. Although two spans, i.e., $45_1$ and $45_j$, are shown in FIG. 1, communication system 10 can include any number of spans and any number of network elements within a span depending on the type and configuration of the network.

In addition to the information bearing communication signals carried in system 10, a service channel signal, usually outside the payload channel bandwidth, is also transmitted. The payload channels, for example, may be in the 1.5 µm range and the service channel signal may be within the 1.3 µm range. The service channel signal carries diagnostic and span topology information for use in a network management system 12.

As illustrated, the service channel signal may be converted to an electrical service channel signal by FOTS 20, for example, which may be supplied to the network management system via a serial or parallel interface line 16. The network management system 12 includes network management software operating on a general purpose computer 22 for sending and receiving data on the service channel. An operator may manipulate system configuration, monitor network performance, perform diagnostic testing, etc., via a graphical user interface (GUI) generated on the display 24 by the management software, which two-way allows communication with each node and network element in the network through the service channel and a user input/output device, e.g, keyboard 14. The network management software may also provide for automated network traffic re-routing in the event of a network disruption, e.g., a fiber break.

Figure 2:
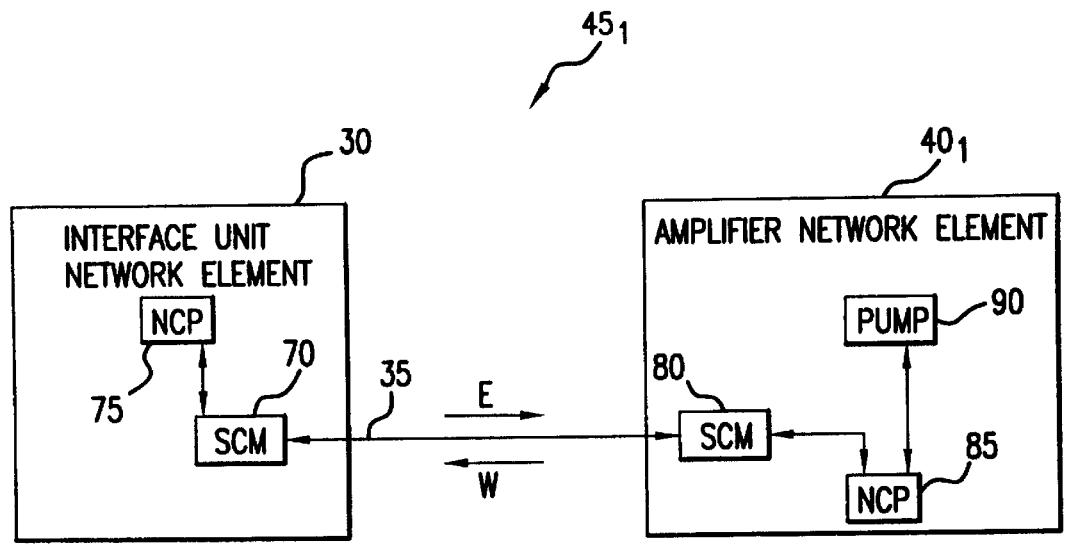
FIG. 2: is a schematic illustration of a particular span within the fiber optic communication system of FIG. 1.

To facilitate communication with the network management system, each network element includes a node control processor (NCP) and a service channel modem (SCM). FIG. 2 schematically illustrates span 45₁ where interface unit network element 30 is coupled to amplifier network element 40₁. Interface unit 30 includes a service channel modem 70 and an NCP 75. Similarly, line amplifier network element 40₁, which can be, for example, an erbium doped fiber supplied by one or more pumping modules 90, also includes a service channel modem 80, and an NCP 85. Line 35 typically includes a first fiber for carrying communications signals in a first east direction, as indicated by arrow E, and a second fiber for carrying communication signals in a second or west direction, as indicated by arrow W.

SCMs 70 and 80 included in interface unit 30 and line amplifier 40₁, respectively, receive and transmit the service channel signal via line 35 to their associated NCPs, 75,85. A particular NCP contains information for the various hardware modules which make up a particular network element. For example, amplifier 40₁ may include a plurality of modules, e.g. an SCM 80, pump sources 90, couplers (not shown), etc., which together make up the amplifier network element 40₁. Similarly, interface unit network element 30 may include a plurality of modules, e.g. an SCM 70, light sources (not shown), modulating components (not shown), etc. As will be described in more detail below, the respective NCPs for each of these network elements 30, 40₁ contain identification information relating to each of these modules. With this identification information, communication by and between NCPs and the modules thereof via the service channel signal is recognized and controlled by the network management software.

NCPs 75 and 85 may be commercially available general purpose microprocessors which track operating information for the associated network element, e.g., interface unit 30 and 40₁, respectively. As illustrated, for example, in FIG. 3 which depicts network element 40₁ in greater detail, each NCP includes a central processing unit (CPU) 100 and memory storage, such as a flash memory 110 and/or random access memory (RAM) 112. Also, each network element module, may include memory storage 88, 98, and a CPU, e.g 82, 92 which communicates with the NCP for controlling and monitoring performance of the module. The identification and operation information, i.e. the software images, for the network element modules which make up the network element, including the NCP, is contained in a software profile file (SPF) stored in the NCP flash memory 110.

When a network element or module changes, e.g. at initial plug-in, replacement, etc., the SPF stored in the NCP associated with this network element, and the software images associated with the modules contained therein, may not be recognizable by the network management software. This may cause system management and maintenance problems. By recognizing that a network element SPF or a particular module software image is incorrect, and automatically downloading the correct SPF into the NCP associated with the network element and the correct software image into each network element module, system disruption is avoided.

Figure 3:
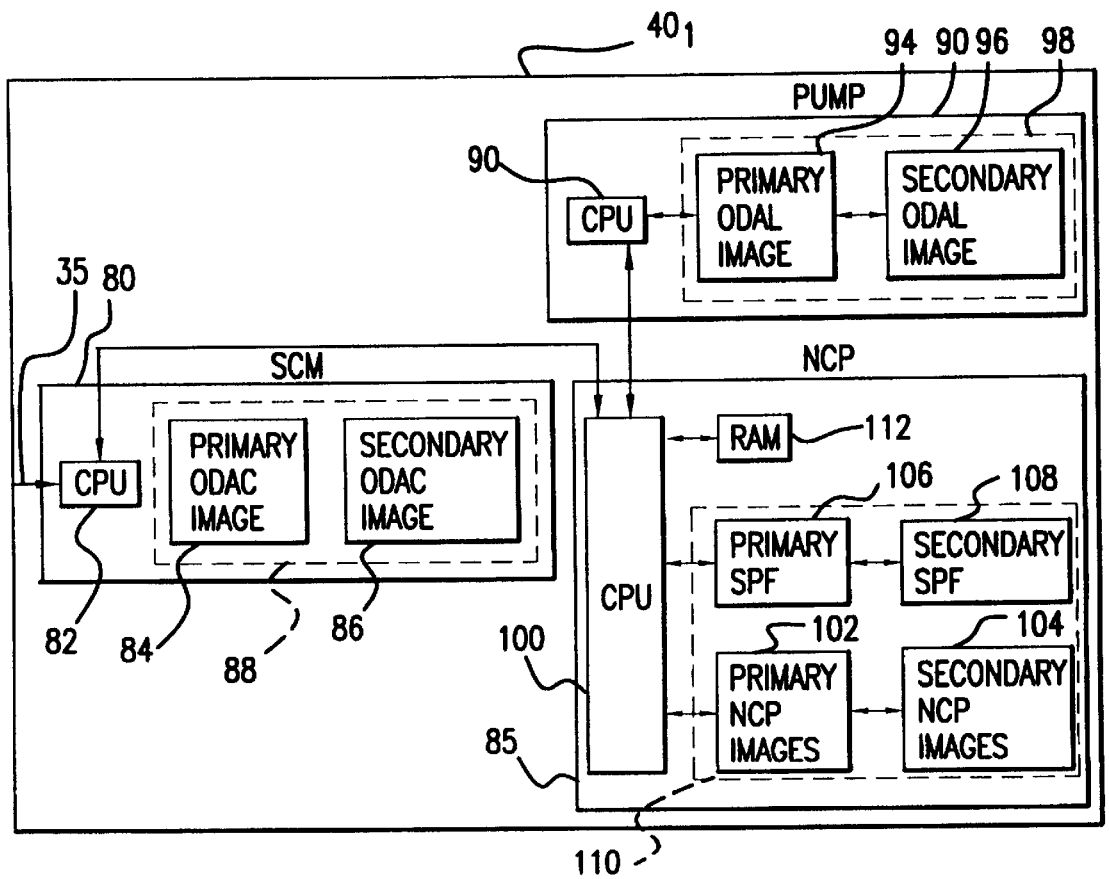
FIG. 3: is a schematic illustration of the amplifier network element depicted in FIG. 2.

Referring still to FIG. 3, for example, each NCP 85 includes a primary 106 and secondary 108 SPF stored in its flash memory device 110. Also, each network element module, e.g., SCM 80, pump 90, and NCP 85 etc., includes a primary 84, 94, 102 and secondary 86, 96, 104 software image, respectively, stored in its memory device 88, 98, 110. The primary SPF is used as the running profile for each network element 40₁, and the primary software image in each module 80, 85, 90 is used as the running image for each module of the network element, as recognized by the network management software.

In each network element, the secondary SPF 108 is used as a temporary SPF for updating the primary SPF prior to transferring the newly loaded SPF to the running or primary SPF. Similarly, in each module of each network element, the secondary software image 86,96,104 is used as a temporary image for updating the software image associated with the module prior to transferring the newly loaded image to the running or primary image. This allows all the secondary SPFs and images to be reconciled among all the network elements and modules within a network element prior to switching the secondary images to the running images, thereby limiting system disruption.

In accordance with the present invention, automatic downloading and updating of network element SPFs and network element module software images is achieved via a software routine which may be stored in the RAM of each NCP for execution by the CPU of each NCP. The routine includes instructions which may be initiated through the network management system by an operator. Those skilled in the art will recognize, however, that software routine may be stored at a variety of locations and initiated in a variety of manners.

For ease of explanation, the operation of a system incorporating a software routine in accordance with the present invention will first be described in general terms with reference to network element 40₁, as illustrated in FIG. 3, and also with reference to the flowchart provided in FIG. 4. It is to be understood that the description provided with reference to element 40₁, applies to all network elements, which may have different network element modules. A detailed description of the steps performed by an exemplary software routine according to the invention will be provided following the general description.

Figure 4:
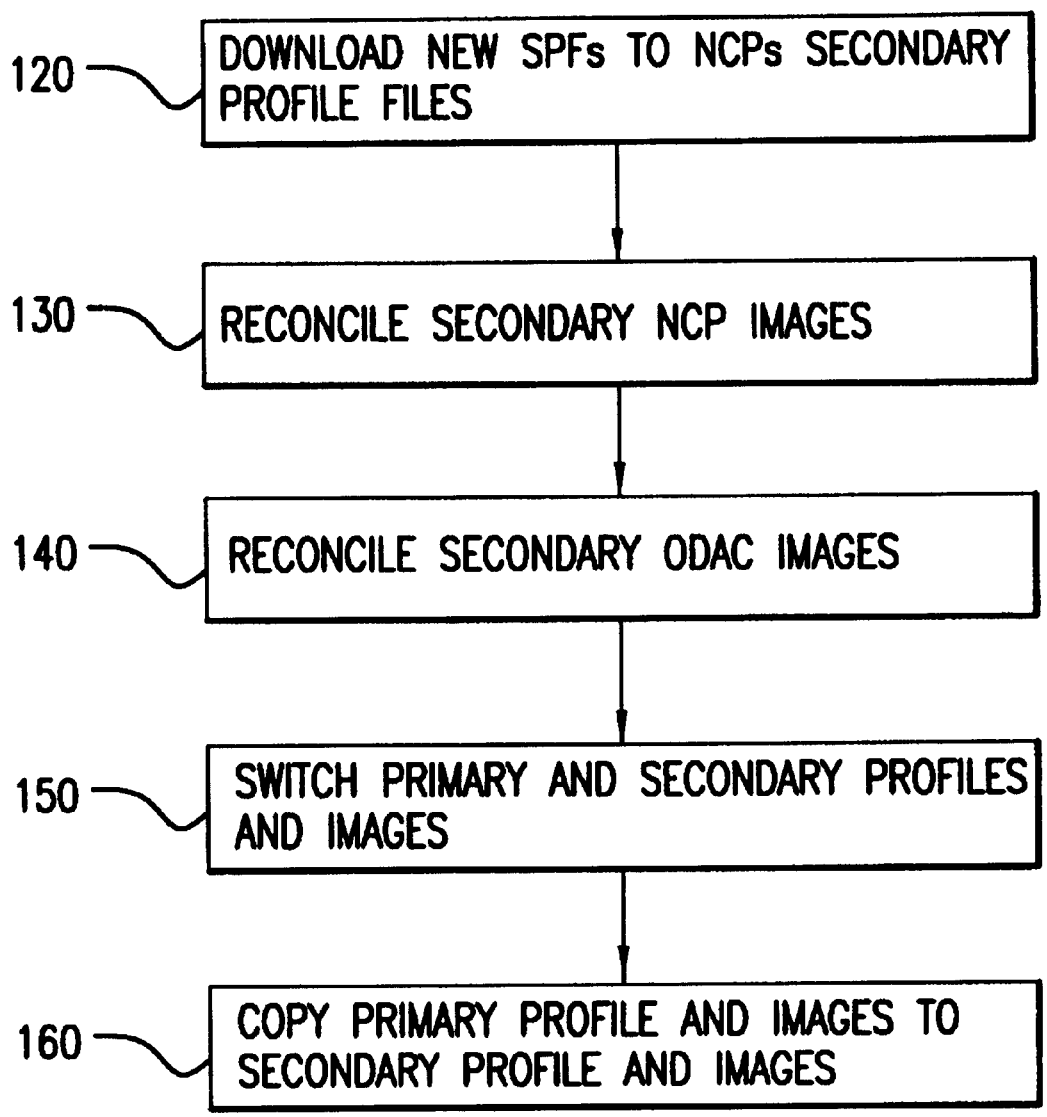
FIG. 4: is a flowchart illustrating the general flow of a software routine in accordance with the present invention.

As depicted at step 120 in FIG. 4, when a network change is initiated which would disrupt communication on the network, e.g., prior to installation of a new network management software revision, installation of a new module, etc., in accordance with the present invention a new SPF is first downloaded into the secondary SPF 108 of the NCP 85. The secondary NCP image 104 is then reconciled 130 with the entry in the new SPF. If the secondary NCP image 104 does not match the entry in the new SPF, then the proper secondary NCP image is automatically downloaded or copied from another location.

Once the secondary NCP image 104 has been reconciled, the secondary images, e.g. 86, 96 of the optical data acquisition and control (ODAC) network element modules are reconciled 140 with their corresponding entries in the new SPF. If the secondary ODAC images do not match the corresponding entries in the new SPF, then the proper ODAC images are downloaded. The downloading process is based on a search algorithm which locates, the most bandwidth efficient way, via service channel signal of system 10, to download the image to the network element module.

Once all secondary images are reconciled with the new secondary SPF 108 in the NCP, an operator action initiates the process of switching 150 the primary and secondary profiles 106,108 and images, 84 and 86, 94 and 96, and 102 and 104, and resetting all modules to guarantee that the new primary images are also the running images. The new set of software images then may be tested prior to an operator action which initiates the copying 160 of the primary SPF 106 and primary images 84, 94, 102 to the secondary SPF 108 and secondary images 86, 96, 104. In this manner, new modules may be inserted into any network element and new network elements may be added to network 10 with the SPF for each network element and the software images for each module within the network element being downloaded automatically to ensure consistent network management operation.

Figure 5A:
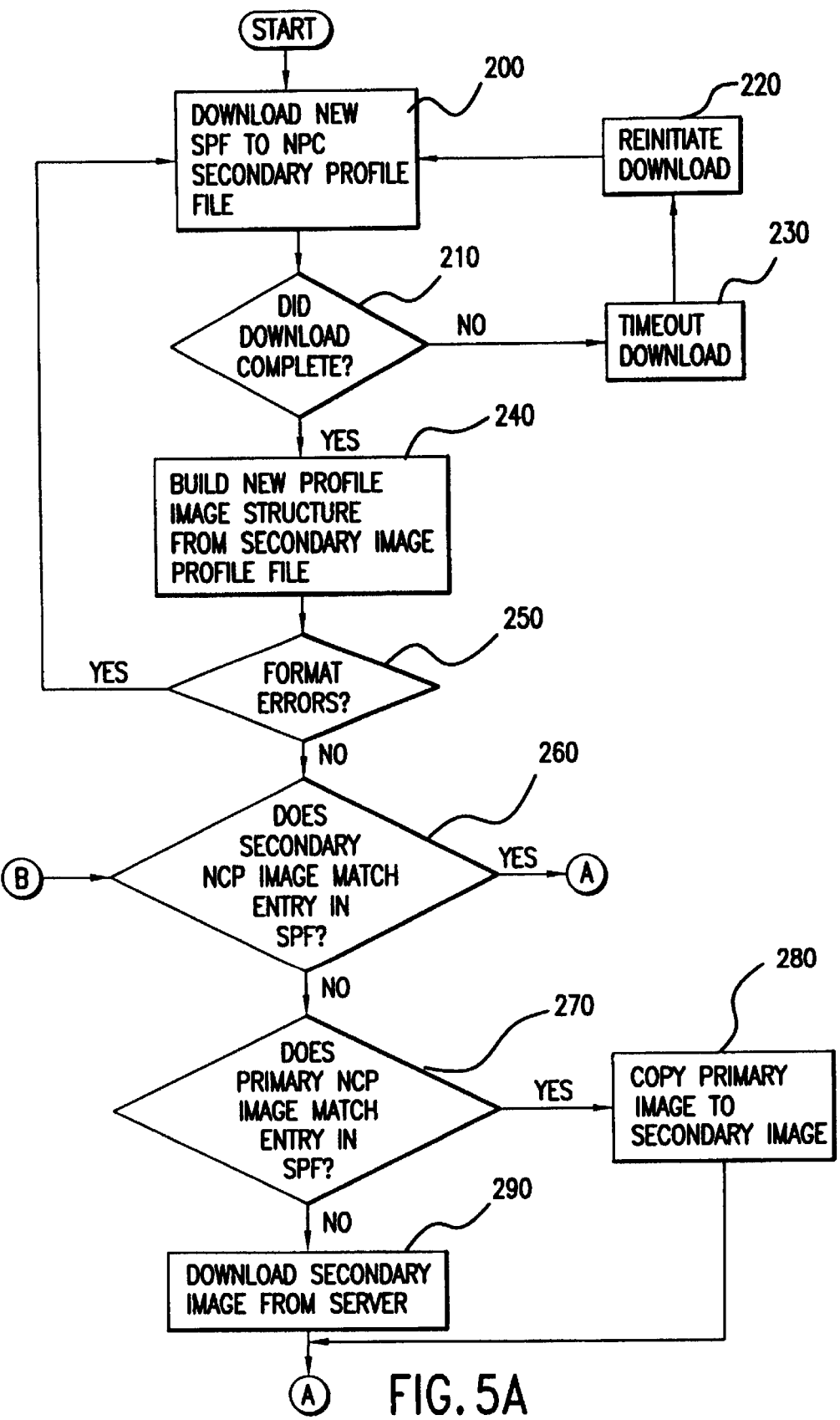
FIGS. 5A–5C: are a flow chart illustrating showing the flow of an exemplary embodiment of a software routine in accordance with the present invention.
Figure 5B:
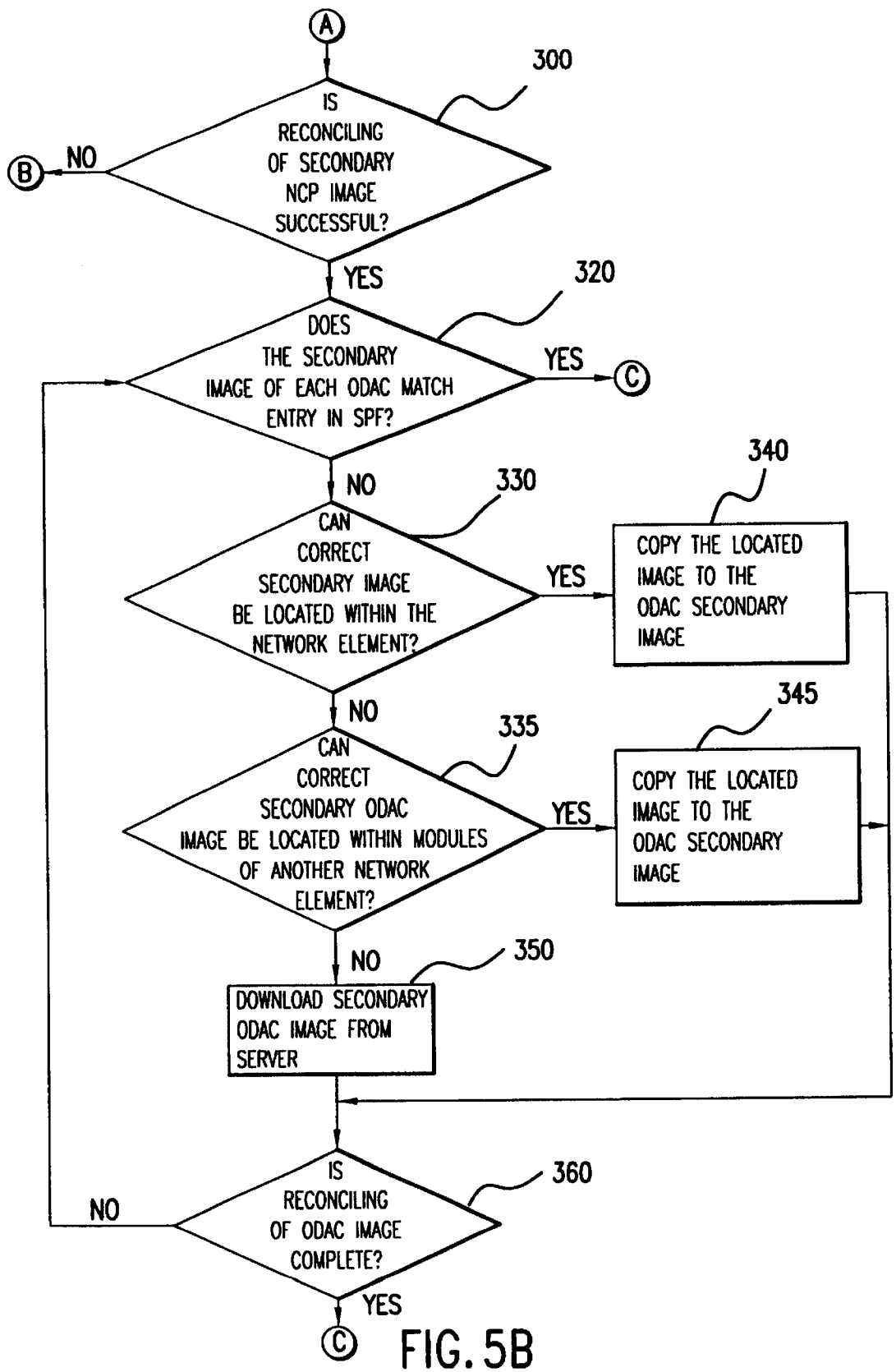
Figure 5C:
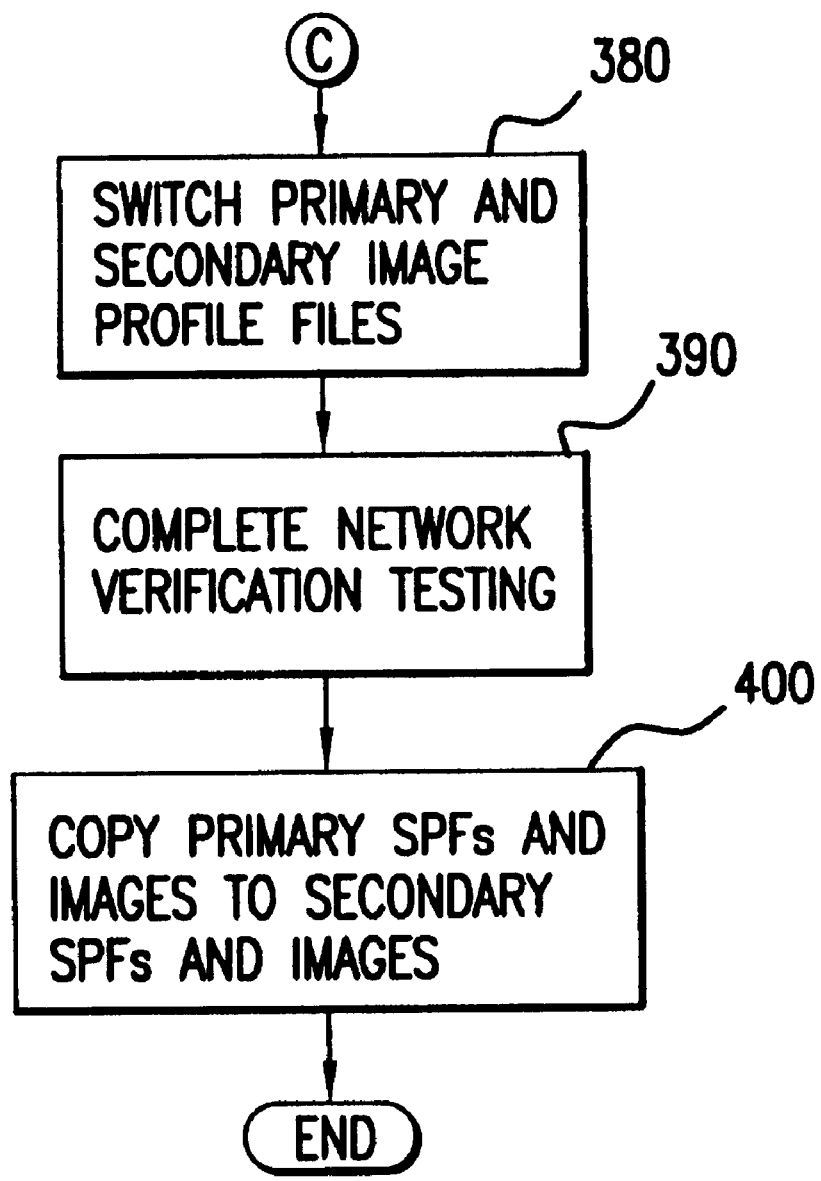

Turning now to FIGS. 5A–5C, there is provided a flowchart showing the flow of an exemplary software program for automatically updating network element SPFs and software images in accordance with the present invention. The software may be written in a variety of languages to achieve the described functions, as will be readily apparent to those skilled in the art. In addition, those skilled in the art will recognize that there are a variety of ways in which to write the software to achieve the functions illustrated in FIG. 4. It is to be understood, therefore, that the flowchart in FIGS. 5A–5C is for purposes of illustration of the flow of one embodiment of a software routine in accordance with the present invention.

As indicated above, the software may be resident in the RAM the network element NCPs for operating on the NCP CPUs. The software may be originally stored on a computer readable medium, e.g., a floppy disk, CD-ROM, hard drive, ZIP disk, etc., and downloaded to the NCPs from, for example, the network management system via the service channel, through a separate file server, directly to the NCP through an RS-232 connection, etc. Again, for ease of explanation, the following description of the downloading and reconciling functions will be described with reference to NCP 85 of the amplifier network element 40₁. It should be understood that each SPF for each network element, and each software image profile for each network element module, may be processed in a similar manner.

As indicated at step 200 an operator action the network management software running on the general purpose computer 22 (FIG. 1) initiates execution of the software routine according to the invention which causes the SPF defining the appropriate software image for each module within a network element to be downloaded via the service channel to the NCP flash memory 10 as the secondary SPF 108. A file transfer procedure, such as a trivial file transfer protocol (TFTP) or file transfer access and management (FTAM), can be used to download the new image profile into the flash memory of NCP 85. For example, a TFTP command may be initiated to a TFTP server 26 (FIG. 1) associated with the network management system 10 to download the new SPF from the server 26 to the NCP 85 via the service channel. Alternatively, the downloading may be performed locally by using a CRAFT interface and directly attaching a terminal (not shown) to the NCP 85 via a RS-232 connection, remotely via a modem, or through a LAN communicating with system 10.

After the SPF is downloaded, a verification 210 is performed to determine if the download of the new secondary SPF 108 was successfully completed without interruption. If it was unsuccessful, the download operation will timeout 230 after a period of time, e.g., 10 seconds. A secondary profile attribute is then marked with a download error condition. The download operation is re-initiated 220 at predetermined intervals until a secondary profile file 108 is downloaded successfully, as verified by step 210.

Once the new secondary SPF 108 has been downloaded into flash memory 110 in NCP 85, this new secondary SPF is automatically uploaded from the flash memory to the NCP RAM 112. The header and data sections of the secondary SPF, which may be in ASCII format, are parsed and a new profile image structure is built 240 in the NCP RAM 103. The secondary profile image structure is a data structure which the executable software routine can use in performing the steps in accordance with the invention, and represents the new secondary SPF 108 stored in NCP 85. The secondary profile image structure is then checked for format errors 250.

If a format error is found, a secondary SPF attribute is marked accordingly, for example, with an alarm state header error condition. The download 200 operation is re-initiated periodically, for example, every 10 seconds, until a secondary SPF is downloaded which can be parsed into a secondary profile image structure 240 without error.

Once the new secondary SPF has been successfully uploaded into the NCP RAM as a secondary profile image structure, the secondary NCP image 104 is reconciled, e.g. as indicated in steps 260–310. If this secondary NCP image 104 matches 260 the entry in the new secondary SPF 108, a verification 310 may be performed and then reconciling of the ODAC images may be automatically initiated at step 320. Otherwise, at step 270 if the primary NCP image 102 matches 270 the entry in the new secondary SPF 108, the reconciling includes copying that primary NCP image 102 to the secondary NCP image 104.

If the primary NCP image does not match the corresponding entry in the new secondary SPF, the reconciling includes downloading 290 the secondary NCP image in the corresponding secondary SPF entry from, for example, a TFTP server 26 (FIG. 1). If the reconciling operation fails 300, retries are performed periodically until it successfully completes. 5 Once the secondary NCP image is reconciled, the secondary images of all ODAC network element modules are reconciled, e.g. as indicated in steps 320–370. For each secondary ODAC image, e.g., 86, 96, that does not match 320 the corresponding entry in the new secondary SPF, reconciling of the secondary ODAC image is initiated. If an image that matches the entry in the new secondary SPF 108 for the secondary ODAC image that needs reconciling can be located 330 in a local module within the associated network element 40₁, the reconciling includes copying 340 the located image from the local module to the secondary ODAC image that needs reconciling.

Alternatively, if the proper secondary ODAC image cannot be located the associated network element 40₁, a search 335 of the other network elements on the optical system 10 is initiated to locate a non-local module that contains the desired image. If the image is found in a non-local module of another network element on the optical system 10, the reconciling includes copying 345 the image from the non-local module that contains the image on the nearest network element to interface unit $40_1$. For example, if the image is located in a module of amplifier network element $40_i$ and interface unit 50, the image will be read from amplifier unit $40_i$. If the image cannot be located in any network element of optical system 10, the reconciling includes downloading 350 the secondary ODAC image, e.g., from a server 26 (FIG. 1) using a file transfer procedure TFTP or FTAM.

Once the proper secondary ODAC image for each ODAC module that needs reconciling is copied or downloaded, a verification 360 may be performed to ensure that reconciling was completed successfully. If the reconciling operation fails, retries may be performed periodically, for example, every 30 seconds, until it successfully completes. If the secondary SPF does not have an entry for the particular module associated with NCP 85, an attribute associated with the reconciling of the secondary profile is marked as not reconciled.

When all secondary images have been successfully reconciled, the secondary SPF is marked as reconciled, and an operator action initiates switching 380 of the secondary SPFs, secondary NCP images, and secondary ODAC images to the corresponding primary SPFs and images. This operation makes the secondary SPF and secondary NCP and ODAC images the active SPF and images in interface unit $40_1$ by swapping the primary and secondary profiles and images in each module and performing a module reset.

Verification testing 390 may be performed to verify the network is operational. Once verification testing is complete, the new SPF images are ready to be made the operating images for NCP 85. The new primary SPF and images are copied 400 and stored as the secondary SPF and images. This ensures that the secondary SPF and images are consistent with the primary or running SPF and images for local flash SPF and image backup during online operation.

To ensure proper operation of NCP 85 and the associated modules and to verify that the foregoing downloading and uploading procedures were performed correctly, the primary and secondary NCP and ODAC images may be further reconciled each time the NCP resets. The procedure is designed to limit the disruption of the primary image and to maintain the running image as the primary image at all times. The primary NCP image 102 is first reconciled, after which all ODAC module primary images 84,94 are simultaneously reconciled. The secondary NCP image 108 and all secondary ODAC module images 86,96 are then reconciled independently when their respective primary images have been reconciled.

Figure 6:
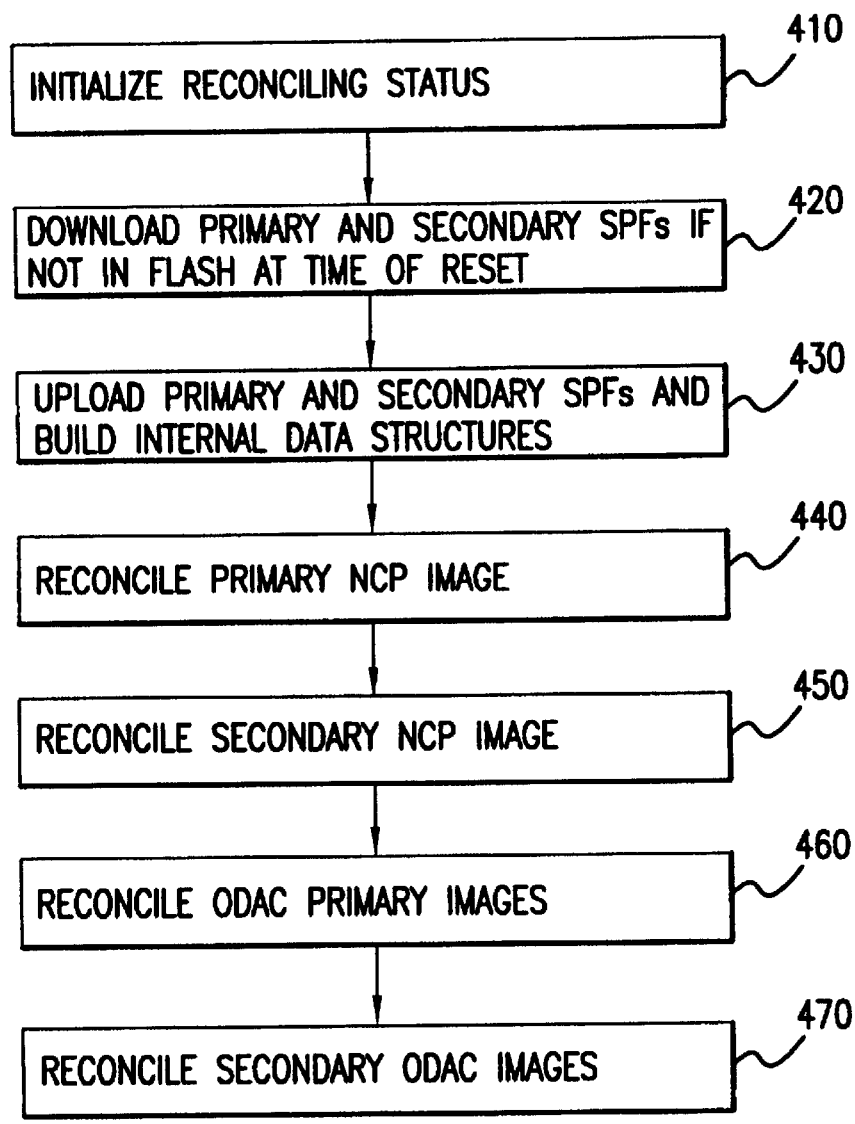
FIG. 6: is a flowchart illustrating the general flow of a software routine for reconciling the primary and secondary images upon a node control processor reset in accordance with the present invention.

As illustrated in FIG. 6, in an exemplary routine for reconciling images upon an NCP reset according to the invention, the first step 410 may be to initialize the attributes which define the reconciling status. At step 420 the primary 106 and secondary 108 SPFs are downloaded if they were not present in the NCP flash memory 110 at the time of the reset, as determined from the attribute status assigned in the first step 410. The primary and secondary SPFs may then be uploaded 430 to the NCP RAM 112 for building internal data structures representing the SPFs.

The primary NCP image 102 is then reconciled 440. The reconciling is initiated if the primary NCP image does not match its associated entry in the new primary SPF 106. If the secondary NCP image 104 matches the entry in the new primary SPF, the reconciling includes copying the secondary NCP image 104 to the primary NCP image 102. Otherwise, the reconciling includes downloading the image in the primary SPF entry to the secondary NCP image 104 from the server 26, and then transferring this image to the primary NCP image 102. The NCP is then reset to guarantee that the running image matches the new primary NCP image. If the reconciling operation fails (e.g., the TFTP server is offline, or the image is not resident on the TFTP server), the operation times out and retries, e.g., every 30 seconds, until it successfully completes. If the primary SPF 106 does not have an entry for the primary NCP image 102, then the primary SPF is marked with an alarm indicating that it has not been reconciled.

In step 450, the secondary NCP image 104 is reconciled. If the primary NCP image 102 matches the entry in the new secondary SPF 108, the reconciling includes copying that primary NCP image 102 to the secondary NCP image 104. If the primary NCP image does not match the corresponding entry in the new secondary SPF, the reconciling includes downloading the secondary NCP image in the corresponding secondary SPF entry from the server 26. If the reconciling operation fails, retries are performed periodically until it successfully completes.

In step 460 all primary ODAC images 84,94 are reconciled. Reconciling is initiated for each primary ODAC image that does not match its corresponding entry in the primary SPF 106. If an image can be located in the network element $40_1$ that matches the entry in the primary SPF for the ODAC that needs reconciling, the reconciling includes copying the located image to the secondary ODAC image 86,96. If the image cannot be located in the network element $40_1$, the reconciling includes downloading the image from the server 26 to the secondary ODAC image.

Once the image has been copied or downloaded to the secondary ODAC image, it is transferred to the primary ODAC image 84,94. The ODAC is then reset to guarantee that the running image matches the new primary ODAC image. If the reconciling operation fails, the operation times out and retries, e.g., every 30 seconds, until it successfully completes. If the primary SPF 106 does not have an entry for the primary ODAC image, then the primary SPF is marked with an alarm indicating that it has not been reconciled.

In step 470 the secondary ODAC images 86,96 are reconciled. Reconciling is initiated for each secondary ODAC image that does not match the corresponding entry in the new secondary SPF 108. If an image that matches the entry in the new secondary SPF 108 for the secondary ODAC image that needs reconciling can be located in a local module within the associated network element $40_1$, the reconciling includes copying the located image to the secondary ODAC image that needs reconciling.

Alternatively, if the proper secondary ODAC image cannot be located in the associated local network element $40_1$, a search of the other non-local network elements on the optical system 10 is initiated to locate a module that contains the desired image. If the image is found in a module of another network element on the optical system 10, the reconciling includes copying the image from the module that contains the image on the nearest network element to interface unit $40_1$. If the image cannot be located in any network element of optical system 10, the reconciling includes downloading the secondary ODAC image 86,96 from the server 26.

Once the proper secondary ODAC image for each ODAC module that needs reconciling is copied or downloaded, a verification may be performed to ensure that reconciling was completed successfully. If the reconciling operation fails, retries may be performed periodically, for example, every 30 seconds, until it successfully completes. If the secondary SPF 108 does not have an entry for the particular module associated with NCP 85, an attribute associated with the reconciling of the secondary profile is marked as not reconciled.

Figure 7:
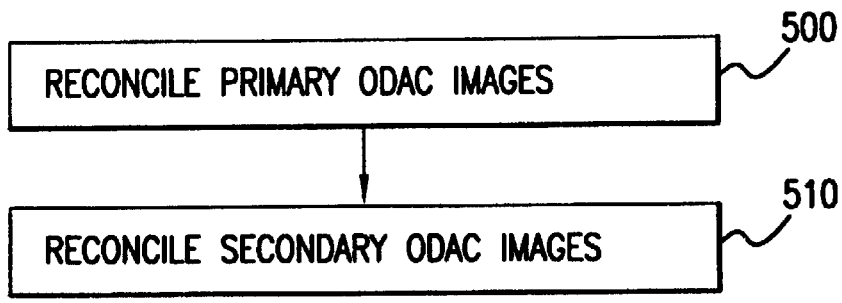
FIG. 7: is a flowchart illustrating the general flow of a software routine for reconciling the primary and secondary images upon an optical data acquisition and control module reset in accordance with the present invention.

To ensure proper operation of NCP 85 and the associated modules, and to verify that the foregoing downloading and uploading procedures were performed correctly, the primary and secondary NCP and ODAC images are further reconciled each time an ODAC module 80,90 resets. The procedure is designed to limit the disruption of the primary image and to maintain the running image as the primary image at all times. As illustrated in FIG. 7, upon an ODAC module reset, the primary ODAC image 84,94 is first reconciled 500, after which the secondary ODAC image 86,96 is reconciled 510. The reconciling of the primary and secondary ODAC images may be performed in the same manner indicated above with respect to steps 460 and 470 in FIG. 6.

There is thus provided a method and apparatus for automatic downloading and updating of network element SPFs and network element module software images. In accordance with the present invention, updating of network element SPFs and network element module software images is achieved via a software routine which may be stored in the RAM of each NCP for execution by the CPU of each NCP. The software may also be stored on any computer readable medium, e.g., floppy disk, CD-ROM, hard drive, ZIP disk, etc., for installation on a network by downloading to the network NCPs. The routine includes instructions which may be initiated through the network management system by an operator, thereby obviating the need for manually updating the module software images, as required in the prior art.

The embodiments which have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An optical communications network comprising:
    a plurality of terminal nodes interconnected through a plurality of network elements for transmitting and receiving at least one optical channel;
    a network management system interconnected with said network elements through a service channel, a plurality of said network elements including a node control processor (NCP) and at least one optical data acquisition control (ODAC) module; and
    a computer-executable software program stored on a computer-readable memory of said NCP for execution by said NCP, said program being executable by an operator through said network management system to perform steps comprising:
        downloading a new software profile file (SPF) to said NCP and storing said new SPF as a new secondary SPF,
        reconciling a secondary NCP image of said NCP with a corresponding entry in said new secondary SPF,
        reconciling a secondary ODAC image in each of said ODAC modules with corresponding entries in said new secondary SPF,
        switching said reconciled secondary NCP image with a primary NCP image of said NCP,
        switching said reconciled secondary ODAC images with corresponding primary ODAC images in each of said ODAC modules,
        copying said primary NCP image to said secondary NCP image, and
        copying said primary ODAC images to said secondary ODAC images.

2. An optical communications network according to said claim 1, wherein said reconciling a secondary NCP image step comprises:
    determining if said primary NCP image matches said entry in said SPF corresponding to said secondary NCP image, and
    copying said primary NCP image to said secondary NCP image if there is a match, but downloading said secondary image if there is no match.

3. An optical communications network according to claim 2, wherein said network further comprises a file server interconnected with said network management system, and wherein said downloading step comprises downloading said secondary image from said file server.

4. An optical communications network according to claim 1, wherein said reconciling a secondary ODAC image step comprises:
    searching for a local module image which matches said entry in said SPF corresponding to said secondary ODAC image within a local module of the network element containing the secondary ODAC image to be reconciled, and, if said local module image can be located, copying said local module image to said secondary ODAC image;
    if a local module image cannot be located, searching for a non-local module image which matches said entry in said SPF corresponding to said secondary ODAC image within a non-local module of a network element which does not containing the secondary ODAC image to be reconciled, and, if said non-local module image can be located, copying said non-local module image to said secondary ODAC image, and
    downloading said secondary ODAC image if said local module image and said non-local module image cannot be located.

5. An optical communications network according to claim 4, wherein said network further comprises a file server interconnected with said network management system, and wherein said downloading step comprises downloading said secondary image from said file server.

6. An optical communications network according to claim 1, wherein said computer-executable software program is executable to further perform reconciling of said primary and secondary NCP images and said primary and secondary ODAC images of each ODAC module upon a reset of said NCP, said reconciling of said primary and secondary NCP images and said primary and secondary ODAC images comprising:
    downloading a new secondary SPF and a new primary SPF to said NCP,
    reconciling said primary NCP image of said NCP with a corresponding primary NCP image entry in said new primary SPF,
    reconciling said secondary NCP image of said NCP with a corresponding secondary NCP image entry in said new secondary SPF,
    reconciling a primary ODAC image in each of said ODAC modules with corresponding primary ODAC image entries in said new primary SPF; and
    reconciling a secondary ODAC image in each of said ODAC modules with corresponding secondary ODAC image entries in said new secondary SPF.

7. An optical communications network according to claim 1, wherein said computer-executable software program is executable to further perform reconciling of said primary and secondary ODAC of images upon a reset of said at least one ODAC module, said reconciling of said primary and secondary ODAC images comprising:

reconciling a primary ODAC image in each of said ODAC modules with corresponding primary ODAC image entries in a new primary SPF; and reconciling a secondary ODAC image in each of said ODAC modules with corresponding secondary ODAC image entries in said new secondary SPF.

8. A method of automatically updating software profile files and image files for a network element in an optical communications network, said network element including a node control processor (NCP) and at least one optical data acquisition control (ODAC) module, said method comprising:

providing a computer-executable software program, said program being executable to perform steps comprising:

downloading a new software profile file (SPF) to said NCP and storing said new SPF as a new secondary SPF, reconciling a secondary NCP image of said NCP with a corresponding entry in said new secondary SPF, reconciling a secondary ODAC image in each of said ODAC modules with corresponding entries in said new secondary SPF, switching said reconciled secondary NCP image with a primary NCP image of said NCP, switching said reconciled secondary ODAC images with corresponding primary ODAC images in each of said ODAC modules, copying said primary NCP image to said secondary NCP image, and copying said primary ODAC images to said secondary ODAC images; and executing said program.

9. A method according to claim 8, said method further comprising storing said program in a computer readable memory of said NCP for execution by a CPU of said NCP.

10. A method according to claim 8, wherein said executing step comprises initiating execution of said program through a network management system of said optical communications network.

11. A method according to claim 8, wherein said reconciling a secondary NCP image step comprises:

determining if said primary NCP image matches said entry in said SPF corresponding to said secondary NCP image, and copying said primary NCP image to said secondary NCP image if there is a match, but downloading said secondary image if there is no match.

12. A method according to claim 11, wherein said network further comprises a file server interconnected with said network management system, and wherein said downloading step comprises downloading said secondary image from said file server.

13. A method according to claim 8, wherein said reconciling a secondary ODAC image step comprises:

searching for a local module image which matches said entry in said SPF corresponding to said secondary ODAC image within a local module of the network element containing the secondary ODAC image to be reconciled, and, if said local module image can be located, copying said local module image to said secondary ODAC image;

if a local module image cannot be located, searching for a non-local module image which matches said entry in said SPF corresponding to said secondary ODAC image within a non-local module of a network element which does not containing the secondary ODAC image to be reconciled, and, if said non-local module image can be located, copying said non-local module image to said secondary ODAC image; and downloading said secondary ODAC image if said local module image and said non-local module image cannot be located.

14. A method according to claim 13, wherein said network further comprises a file server interconnected with said network management system, and wherein said downloading step comprises downloading said secondary image from said file server.

15. A method according to claim 8, wherein said computer-executable software program is executable to further perform reconciling of said primary and secondary NCP images and said primary and secondary ODAC images of each ODAC module upon a reset of said NCP, said reconciling of said primary and secondary NCP images and said primary and secondary ODAC images comprising:

downloading a new secondary SPF and a new primary SPF to said NCP, reconciling said primary NCP image of said NCP with a corresponding primary NCP image entry in said new primary SPF, reconciling said secondary NCP image of said NCP with a corresponding secondary NCP image entry in said new secondary SPF, reconciling a primary ODAC image in each of said ODAC modules with corresponding primary ODAC image entries in said new primary SPF; and reconciling a secondary ODAC image in each of said ODAC modules with corresponding secondary ODAC image entries in said new secondary SPF.

16. A method according to claim 8, wherein said computer-executable software program is executable to further perform reconciling of said primary and secondary ODAC of images upon a reset of said at least one ODAC module, said reconciling of said primary and secondary ODAC images comprising:

reconciling a primary ODAC image in each of said ODAC modules with corresponding primary ODAC image entries in a new primary SPF; and reconciling a secondary ODAC image in each of said ODAC modules with corresponding secondary ODAC image entries in said new secondary SPF.

17. A computer-readable medium having computer-executable software program stored thereon, the program for automatically updating software profile files and software image files in a network element of an optical communications network, said network element having a node control processor (NCP) and a plurality of optical data acquisition data (ODAC) modules, the program comprising:

code for downloading a new software specific file (SPF) to said NCP and storing said new SPF as a new secondary SPF, code for reconciling a secondary NCP image with a corresponding entry in said new secondary SPF;

code for reconciling a secondary ODAC image in each of said plurality of ODAC modules with corresponding entries in said new secondary SPF;

code for switching said reconciled secondary NCP image with a primary NCP image, and for switching said reconciled secondary ODAC images with corresponding primary ODAC images; and code for copying said primary NCP image to said secondary NCP image, and for copying said primary ODAC images to said secondary ODAC images.

18. A computer-readable medium according to claim 17, wherein said computer-readable medium is selected from the group consisting of: a floppy disk, a CD-ROM, a hard drive, and a ZIP disk.

19. A computer-readable medium according to claim 17, wherein said code for reconciling a secondary NCP image step comprises:

code for determining if said primary NCP image matches said entry in said SPF corresponding to said secondary NCP image, and code for copying said primary NCP image to said secondary NCP image if there is a match, but downloading said secondary image if there is no match.

20. A computer-readable medium according to claim 19, wherein said network further comprises a file server interconnected with said network management system, and wherein said code for downloading comprises code for downloading said secondary image from said file server.

21. A computer-readable medium according to claim 17, wherein said code for reconciling a secondary ODAC image comprises:

code for searching for a local module image which matches said entry in said SPF corresponding to said secondary ODAC image within a local module of the network element containing the secondary ODAC image to be reconciled, and, if said local module image can be located, copying said local module image to said secondary ODAC image;

code for searching for a non-local module image which matches said entry in said SPF corresponding to said secondary ODAC image within a non-local module of a network element which does not containing the secondary ODAC image to be reconciled, if said local module image cannot be located, and, if said non-local module image can be located, copying said non-local module image to said secondary ODAC image; and code for downloading said secondary ODAC image if said local module image and said non-local module image cannot be located.

22. A computer-readable medium according to claim 21, wherein said network further comprises a file server interconnected with said network management system, and wherein said code for downloading comprises code for downloading said secondary image from said file server.

23. A computer-readable medium according to claim 17, wherein said program further comprises code for reconciling said primary and secondary NCP images and said primary and secondary ODAC images of each ODAC module upon a reset of said NCP, said code for reconciling said primary and secondary NCP images and said primary and secondary ODAC images comprising:

code for downloading a new secondary SPF and a new primary SPF to said NCP, code for reconciling said primary NCP image of said NCP with a corresponding primary NCP image entry in said new primary SPF, code for reconciling said secondary NCP image of said NCP with a corresponding secondary NCP image entry in said new secondary SPF, code for reconciling a primary ODAC image in each of said ODAC modules with corresponding primary ODAC image entries in said new primary SPF; and code for reconciling a secondary ODAC image in each of said ODAC modules with corresponding secondary ODAC image entries in said new secondary SPF.

24. A computer-readable medium according to claim 17, wherein said program further comprises code for reconciling said primary and secondary ODAC of images upon a reset of said at least one ODAC module, said code for reconciling said primary and secondary ODAC images comprising:

code for reconciling a primary ODAC image in each of said ODAC modules with corresponding primary ODAC image entries in a new primary SPF; and code for reconciling a secondary ODAC image in each of said ODAC modules with corresponding secondary ODAC image entries in said new secondary SPF.

25. An optical communications network made up of a plurality of nodes interconnected so as to communicate data over one or more optical channels, each of said plurality of nodes comprising:

a plurality of module elements for providing the operational functions of the corresponding node;

a node control processor which provides supervisory control of the module elements within said corresponding node, said node control processor including:

a primary storage and a secondary storage for storing a software profile file; and a primary and a secondary storage for storing a software image associated with said software profile file;

wherein upon receipt of a new software profile file from a network management system connected to said plurality of nodes through one of said optical channels, said node control processor operating to replace said secondary software profile file with said new software profile file, reconcile said secondary image so as to correspond to said new secondary software profile file and switch said new secondary software profile file and said reconciled secondary image with a primary software profile file and a primary software image.

26. The optical communications network of claim 25, wherein the module elements include an optical data acquisition control.

27. The optical communications network of claim 25, wherein a plurality of said module elements contain an executable file, which includes:

a primary storage and a secondary storage for storing software images associated with said software profile file of said node control processor;

wherein upon receipt of a new software profile file by said node control processor the secondary image is reconciled so as to correspond to said new secondary software profile file of said node control processor and said reconciled secondary image is switched with said primary software image at substantially the same time as performed in said node control processor.

28. The optical communications network of claim 27, wherein the switched primary software image of each module element is copied to said secondary module element upon verification of performance performed in said node control processor.

29. The optical communications network of claim 25, wherein upon verification of performance of said switched primary software profile file and primary software image, said switched primary software profile file and primary software image are copied to said secondary software profile file and secondary software image.

* * * * *